Sept. 28, 1971     R. W. BORRESEN ET AL     3,608,228
FISHING LURE
Filed March 24, 1969
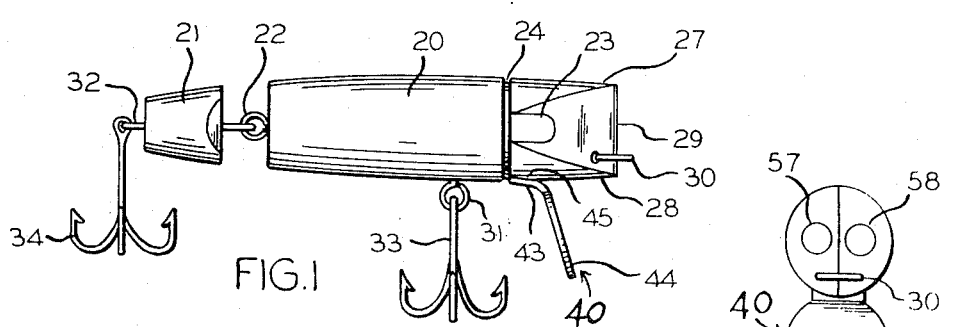
FIG.1
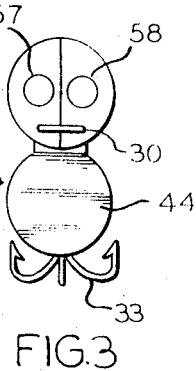
FIG.3
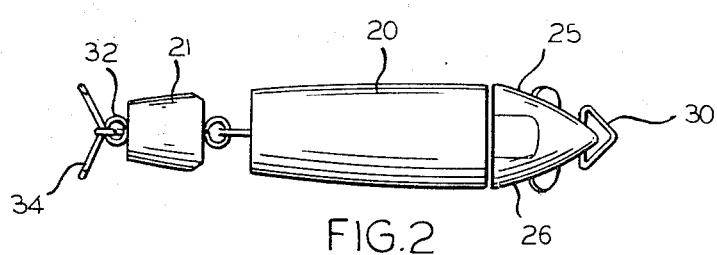
FIG.2
FIG.6
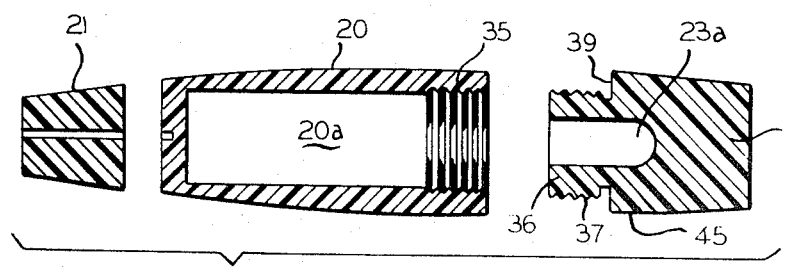
FIG.4
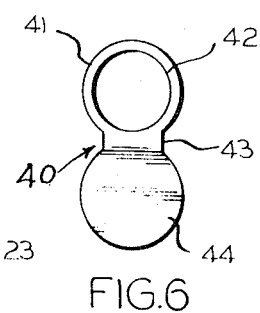
FIG.7
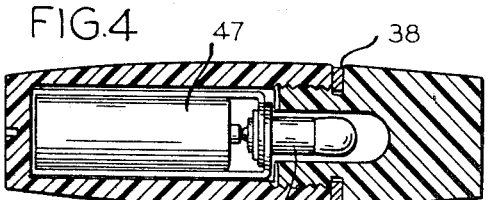
FIG.5
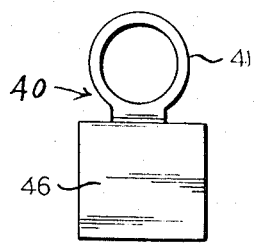
FIG.8
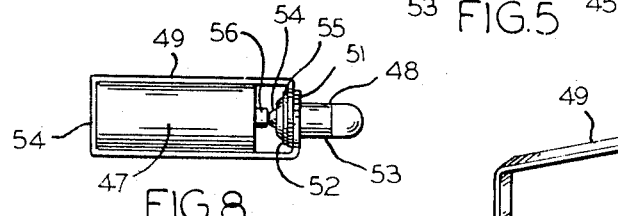
FIG.10
FIG.9
INVENTORS
ROY W. BORRESON
ROBERT J. MEIER
BY
Mann, Brown & McWilliams
ATTORNEYS

United States Patent Office 3,608,228
Patented Sept. 28, 1971

3,608,228
FISHING LURE
Roy W. Borresen, 447 Lowell, Glen Ellyn, Ill. 60137, and Robert J. Meier, 2805 E. Hickory Drive, Wonder Lake, Ill. 60097
Filed Mar. 24, 1969, Ser. No. 809,647
Int. Cl. A01k 85/00
U.S. Cl. 43—17.6    4 Claims

ABSTRACT OF THE DISCLOSURE

A fishing lure of plug type comprised of hollow detachable sections and which are provided with facilities for illuminating means. Various weights may be positioned within the lure cavity and varied types of deflecting surfaces may be attached to the lure body to control movement and action of the lure in the water. The head section is wedge-shaped and formed of translucent material to provide a prismatic effect for the illumination means to form eye-simulating circular illuminated areas on each side of the head section.

---

The present invention is directed to new and useful improvements in fishing lures and is particularly directed to lures of the plug type which may be used in casting or trolling.

The major purposes of the present invention are to form a lure with hollow detachable sections in such a manner that the lure is easily manufactured and enables quick attachment and detachment of a variety of spoons with the lure to provide varied actions for the lure, and at the same time forming the lure in such a manner that it allows selective use of various weights within the lure to control the action of the lure and selective use of illumination within the lure. A related purpose of the invention is to form such a lure in a manner allowing use of simple, efficient and convenient battery and lamp assemblies while providing simulated "eyes" through use of the lamp. A further related purpose is to create simplified battery and lamp supporting and energizing assemblies which are useful in such a lure. These and other purposes of the invention will become more apparent in the course of the ensuing specification and claims when taken with the accompanying drawings, in which:

FIG. 1 is a side view of the fishing plug incorporating the principles of the present invention;

FIG. 2 is a top view of the lure illustrated in FIG. 1;

FIG. 3 is a front view of the lure illustrated in FIG. 1;

FIG. 4 is a sectional view of the lure body as illustrated in FIGS. 1, 2 and 3;

FIG. 5 is a sectional view of the assembled lure body and head sections with the illuminating battery and lamp positioned therein;

FIG. 6 is a front view of one spoon which may be utilized in the assembled lure of FIGS. 1, 2 and 3;

FIG. 7 is a front view of another spoon which may be utilized in the assembled lure of FIGS. 1, 2 and 3;

FIG. 8 is a side view of the battery and lamp assembly illustrated in FIG. 5;

FIG. 9 is a perspective view of a battery and lamp holding strap illustrated in FIGS. 5 and 8; and FIG. 10 is another perspective view of the strap illustrated in FIG. 9 while illustrating an expanded condition of the strap.

Like elements are designated by like characters throughout the specification and drawings.

With specific reference now to the drawings, and in the first instance to FIG. 1, the numeral 20 designates an elongated hollow body constituting the main portion of the fishing lure. A tail section 21 is swivelly connected to the rear of the main body as by the swivelled eyelets 22. A head section 23 is detachably coupled to the front of the main body 20. The body 20 has a circular cross-section and is somewhat barrel-like in shape with the body being tapered to slightly reduced diameters at the front and rear of the main body section 20. The tail piece 21 has also a circular cross-sectional shape and is tapered to provide what is in effect a continuation of the shape of the main body section 20. The head 23 of the lure has a circular cross-sectional shape at its point of juncture with the main body section 20, as at 24, and has a tapered configuration as viewed in plan (FIG. 2) with the taper providing sides 25 and 26 which are slightly curved to form a continuation of the curvature of the main body section 20 when viewed in plan as in FIG. 2.

The top and bottom surfaces 27 and 28 of the head may be formed so as to provide a uniform height of the head section although it is preferable that these surfaces be slightly tapered as shown. The shape of the head is such as to provide a more or less external wedge shape terminating in a front or leading edge 29. The side surfaces 25 and 26 which define the wedge-like shape tend to minimize rolling of the lure as it is drawn through the water.

An eyelet 30 is fixed around the leading edge of the head at a lower position. The main body section 20 and tail section 21 have suitable eyelets 31 and 32 fixed thereto for carrying appropriate hooks 33 and 34. Hook 34 may be suspended from the rear face of the tail piece 21 so as to provide a trailing hook while hook 33 may be suspended from the body at the bottom thereof and slightly forwardly of the center of the main body section 20.

As is seen particularly in FIG. 4 and in FIG. 5, the main body section 20 is hollow to define a cavity 20a therein and is provided with internal screw threads 35 at the forward portion thereof. The head 23 has a reduced boss 36 on the rear thereof with screw threads 37 so that the boss may be screwed into the threaded portion 35 of the body cavity. When the head and main body section are assembled, a washer 38 of neoprene or similar material is positioned around the boss 36 so that the shoulder 39 of the head presses against this washer or gasket and against the forward face of the main body section so as to provide a seal between these two parts as is illustrated in FIG. 5.

In order to provide varied actions for the lure, spoons as illustrated at 40 in FIGS. 1, 3, 6 and 7 may be utilized. These spoons may be defined by a single piece of deformed metal with a circular portion 41 having an aperture 42 defining an annular ring sized to fit over the boss 36. These spoons have an offset portion 43 between the circular connecting portion 41 and a circular or other shape of deflecting surface 44. The offset portion 43 is positioned close to the surface of the head section. As is seen in FIG. 6, the deflecting surface 44 may be somewhat circular in outline. The lower surface of the head section 23 may be undercut as at 45 so as to receive the offset portion 43 and hold the deflecting surface 44 in the correct relation to the head section, as is illustrated in FIGS. 1 and 3.

The connecting section 41 of the spoon is fitted over boss 36 and positioned beween the sealing gasket 38 and the shoulder 39 of the head section. Other shapes of spoons may be provided for varied effects. For example, in FIG. 7 the deflecting surface 46 is generally rectangular as viewed from the front and generally presents more surface area to resist movement through the water than the surface 44 in FIG. 6 to thus allow the plug to go deeper (than the spoon of FIG. 6) as it is pulled through the water. The deflecting surfaces 44 and 46 may be formed at various angles with respect to the main longitudinal axis of the lure to provide varying effects.

Various weights may be positioned within the cavity of the main body section to provide varying effects. The particular formation of the head and main body section allows selective use of various weights within the body and head sections and also provides a simple and convenient method for quickly attaching and detaching varying types and styles of spoons for varied fishing actions. The particular formation of the main body section 20 and head 23 also provide a simple and convenient method for providing a lighted effect for the lure. The lighted effect is provided, for example, by a battery and lamp assembly illustrated in FIGS. 5, 8, 9 and 10. A small battery 47 has a diameter slightly less than the diameter of the hollow interior of the main body 20 and is held in assembled relation to a light bulb 48 by a connecting strap 49. Strap 49 is formed as a single piece of metal which is doubled around the battery and formed with circular ends 50 and 51. The circular ends 50 and 51 have apertures 52 therein with a size to snugly receive the base 53 of the lamp 48. The length of the strap is such that, when doubled around the opposite sides of the battery, the midportion 54 of the strap abuts against the bottom or rear surface of the battery while the strap snugly engages opposite sides of the battery. The circular end portions 50 and 51 receive the cylindrical base portion 53 of the lamp and abut against the flange 55 of the lamp and hold the terminal 54 of the lamp 48 snugly against the terminal 56 of the battery. The lamp and battery are simply assembled by positioning the end portions 50 and 51 of the strap in overlying relation, whereupon the lamp is inserted through the apertures 52 in the overlying end portions 50 and 51 and positioned so that the end portions are relatively snug against the flange on the base portion of the lamp. The battery is then moved into the loop of the strap (as in FIG. 8) until it is snugly positioned within the strap and with the terminal 56 of the battery in contact with the terminal 54 of the lamp. The metal strap thus connects the base of the battery with the base 53 of the lamp. The assembled battery, strap and lamp are inserted into the cavity 20a of the main body section and the lamp 48 projects into the cavity 23a of the head 23. In the assembled position, as illustrated in FIG. 5, the rear face of the boss 36 may abut against the circular end portions 50 and 51 of the strap so as to hold the battery and lamp assembly snugly within the lure. The resiliency of the straps allows for some variation in tolerances while insuring that the head section is sealed against the main body section 20.

The main body section 20, tail section 21 and head section 23 are easily formed by machining plastic rods. The rod material used, for example, may be nylon, acrylic, or other known grades of plastic materials which are relatively rigid and yet easily machined. The head section 23 is formed from a translucent or transparent palstic such as certain known grades of acrylic plastics and when the head section is given the shape illustrated, the single illuminating lamp positioned within the head cavity 23a provides two simulated well-defined eyes as designated at 57 and 58 in FIG. 3, by reason of the prismatic effect gained through the wedge shape of the head section. The wedge shape inherently provides illuminated areas of high intensity to define the eyes.

In use, the particular head section shape minimizes rolling tendencies of the lure as it is drawn through the water by the customary fishing line attached to eyelet 30. Varied actions may be provided in the lure by detaching the head section 27 and inserting a spoon of a desired shape and area for a particular type of action. The main body cavity 20a and/or the head section cavity 23a may be filled or partially filled with various weights as desired in accordance with the desired depth and type of lure action desired. The head section and body section may be used easily with an illuminating assembly as disclosed herein so as to increase the attractiveness of the lure.

We claim:

1. A fishing lure of the plug type including a main body section and a head section detachably coupled together, said head section and said body section having aligned cavities therein, said head section having a reduced boss threadably received within the cavity of said body section, a deflecting surface having a portion fitted over said boss and another portion extended laterally from said sections, and hook means associated with said main body section, said head section having a wedge shape to define a leading edge extending transversely to the axis of said body section, a battery and lamp assembly positioned within the cavities of said body section and said head section with the lamp projecting into said head section, said head section being formed from a translucent material thereby providing a prismatic effect for the light in said cavity and divided by the wedge shape of said head section to form circular illuminated areas on each side of said head section, said battery and lamp assembly including a strap for detachably holding said battery and lamp in an assembled, electrically connected energizing condition, said strap being defined by a single piece of looped metal embracing the base and opposite sides of said battery and having overlapped apertures in opposite end portions receiving the base of said lamp while holding the terminal of said lamp snugly against the terminal of said battery.

2. A fishing lure of the plug type including a main body section and a head section detachably coupled together, said head section and said body section having aligned cavities therein, said head section having a reduced boss threadably received within the cavity of said body section, said head section having an external wedge shape to define a leading edge extending transversely to the axis of said body section, a battery and lamp assembly positioned within the cavities of said body section and said head section with the lamp projecting into said head section, said head section being formed from a translucent material thereby providing a prismatic effect for the light in said cavity and divided by the wedge shape of said head section to form well-defined eye-simulating circular illuminated areas of high intensity on each side of said head section, and hook means associated with said lure.

3. The structure of claim 2 characterized by and including a deflecting surface extending laterally from said head section, said surface being generally aligned with the leading edge of said head section when the lure is viewed from the front.

4. The structure of claim 3 characterized by and including a tail section swivelly carried by the rear of said main body section, and hook means carried by said tail section.

References Cited

UNITED STATES PATENTS

| 2,999,331 | 9/1961 | Northrup et al. | 43—42.48 |
|---|---|---|---|
| 2,190,791 | 2/1940 | Larson | 43—17.6X |
| 2,237,534 | 4/1941 | Van Der Clute | 43—17.6 |
| 2,627,136 | 2/1953 | Sinclair | 43—42.15X |
| 2,740,220 | 4/1956 | Caplan | 43—17.6 |
| 2,994,982 | 8/1961 | Murawski | 43—42.39X |
| 3,001,315 | 9/1961 | Zimmermann | 43—17.6 |

FOREIGN PATENTS

| 81,412 | 3/1953 | Norway | 43—42.48 |
|---|---|---|---|
| 619,994 | 3/1949 | Great Britain | 43—42.15 |

SAMUEL KOREN, Primary Examiner

D. J. LEACH, Assistant Examiner

U.S. Cl. X.R.

43—42.09, 42.15, 42.22, 42.39